United States Patent [19]
Kazumi et al.

[11] Patent Number: 5,508,767
[45] Date of Patent: Apr. 16, 1996

[54] PREWIND FILM FEED CONTROL DEVICE THAT ENSURES ALIGNMENT OF FILM FRAME WITH CAMERA APERTURE

[75] Inventors: Kazuyuki Kazumi, Tokyo; Koichi Daitoku, Sagamihara, both of Japan

[73] Assignee: Nikon Corporation, Tokyo, Japan

[21] Appl. No.: 407,251

[22] Filed: Mar. 20, 1995

Related U.S. Application Data

[63] Continuation of Ser. No. 245,822, May 18, 1994, abandoned, which is a continuation of Ser. No. 150,241, Nov. 9, 1993, abandoned, which is a continuation of Ser. No. 920,524, Jul. 28, 1992, abandoned, which is a continuation of Ser. No. 720,719, Jun. 25, 1991, abandoned.

[30] Foreign Application Priority Data

Jun. 28, 1990 [JP] Japan .................................. 2-173998

[51] Int. Cl.⁶ .............................. G03B 1/18; G03B 17/24
[52] U.S. Cl. ........................ 354/106; 354/173.1; 354/213
[58] Field of Search ..................................... 354/105, 106, 354/173.1, 173.11, 206, 213

[56] References Cited

U.S. PATENT DOCUMENTS

| | | | |
|---|---|---|---|
| 4,671,636 | 6/1987 | Malloy Desormeaux | 354/214 |
| 4,860,037 | 8/1989 | Harvey | 354/105 X |
| 4,864,332 | 9/1989 | Harvey | 354/21 |
| 4,903,061 | 2/1990 | Harvey | 354/213 |
| 4,918,474 | 4/1990 | Kawamura et al. | 354/173.1 |

*Primary Examiner*—W. B. Perkey
*Attorney, Agent, or Firm*—Shapiro and Shapiro

[57] ABSTRACT

A film feed control device of a camera in a prewind method in which unexposed film is pulled out from a loaded film cartridge and rewound into the film cartridge for each photography comprises a frame number memory for storing an exposable frame number of said film, a frame counter for counting a feed frame number by detecting the perforations of said film, a pulled-out film length detector for detecting that said exposable frame number of frames are pulled out from said film cartridge, based on said feed frame number counted by said frame counter and said exposable frame number stored in said frame number memory, and a film feed control for controlling the film feed so as to pull out said film by a predetermined amount even after the pull-out of the exposable frame number is detected, and then to oppose the first frame to be set at a predetermined position of said film to an aperture by reversing the film feed direction, when unexposed film is pulled out prior to photographing.

16 Claims, 9 Drawing Sheets

PERFORATION DETECTION

FIG. 10B

FILM FEED MOTOR APPLIED VOLTAGE

FIG. 10C

SHORT-BRAKE

FIG. 11

PREWIND FILM FEED CONTROL DEVICE THAT ENSURES ALIGNMENT OF FILM FRAME WITH CAMERA APERTURE

This is a continuation of application Ser. No. 08/245,822 filed May 18, 1994, now abandoned, which is a continuation of application Ser. No. 08/150,241 filed Nov. 9, 1993 (abandoned), which is a continuation of application Ser. No. 07/920,524 filed Jul. 28, 1992 (abandoned), which is a continuation of application Ser. No. 07/720,719 filed Jun. 25, 1991 (abandoned).

BACKGROUND OF THE INVENTION

1. Field of the Invention

The present invention relates to a film feed control device of a camera operated in the prewind method.

2. Related Background Art

Conventionally, a film feed control device of a camera operating in the prewind method in which all unexposed film is pulled out from a film cartridge loaded therein and rewound into the film cartridge for each photograph has been well known. This conventional device pulls out unexposed film from a new loaded film cartridge, and stops if the first frame arrives at a predetermined photography position, i.e., a position opposed to an aperture of the camera. If the photography at the first frame has terminated, the film feed direction is reversed to set the second frame at a predetermined photography position. Thereafter, in a similar manner, the film is rewound into the film cartridge for each photograph.

Also, it is well known to record various information onto a magnetic recording medium applied on the film (U.S. Pat. No. 4,864,332).

When the information recorded on the film is one for each picture plane, the recorded information can not be reproduced in correspondence with each picture plane if such information is not recorded at a predetermined position for each picture plane. Accordingly, for recording the information in correspondence with each picture plane, the control precision of the stop position at the feeding of film is an important problem.

However, if the feed of film is controlled with a conventional method for a film feed control device of a camera, i.e., a method in which the first frame of a picture plane is positioned at a predetermined picture position while pulling out the film from the cartridge, and the second and subsequent frames are positioned while rewinding the film by reversing the feed direction, the amount of control error in positioning the first frame, or the overshoot, may appear in a direction different from that in positioning the second and subsequent frames, so that a problem arises that only the picture plane of the first frame may be deviated from other planes.

Especially, with a camera for making the prewind at high speed, the overshoot at the positioning of the first frame is so large that this problem becomes manifest.

SUMMARY OF THE INVENTION

An object of the present invention is to provide a film feed control device of a camera for positioning correctly the first frame at a predetermined picture position.

A further object of the present invention is to provide a camera using a film having perforations on left and right upper portions of each plane, wherein said camera allows the photographing when the perforations on said left and right upper portions are properly positioned.

Other objects of the present invention will become apparent from the following description with reference to the drawings.

DETAILED DESCRIPTION OF THE PREFERRED EMBODIMENTS

Figure 1:
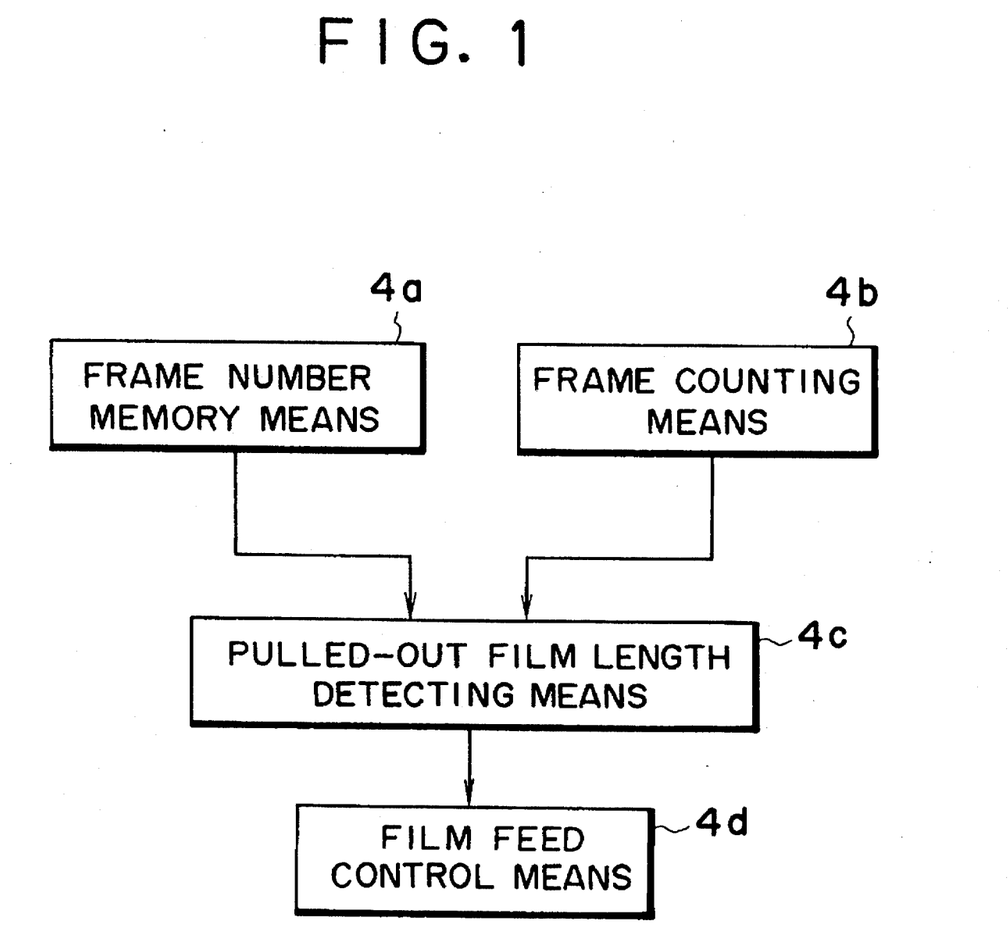
FIG. 1 is an explanatory diagram.

Referring now to FIG. 1, the present invention is applied to a film feed control device of a camera using the prewind method in which unexposed film is pulled out from a film cartridge prior to photographing and then is rewound into the film cartridge for each photograph. According to the present invention, the device comprises frame number memory means 4a for storing the exposable frame number of film, frame counting means 4b for counting the feed frame number of film by detecting perforations of film, pulled-out film length detecting means 4c for detecting that the exposable frame number has been pulled out from the film cartridge, based on the feed frame number counted by the frame counting means 4b and the exposable frame number stored in the frame number memory means 4a, and film feed control means 4d for controlling the film feed. The film feed is controlled such that when unexposed film is pulled out prior to photographing, the film is pulled out by a predetermined amount after the pulled-out film length detecting means 4c detects that the exposable frame number has been pulled out, and then, by reversing the film feed direction, a first exposable frame is aligned with an aperture of the camera.

Figure 2:
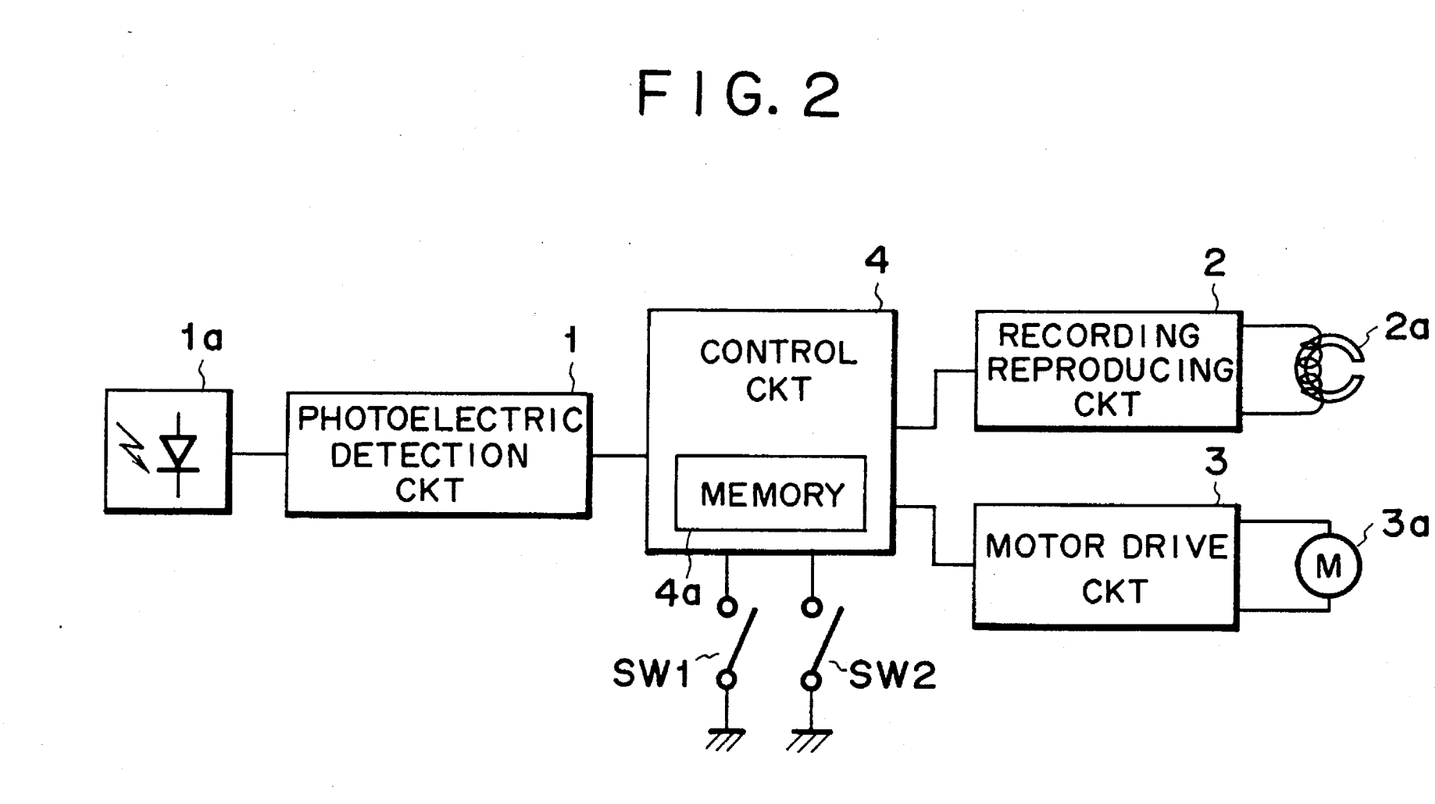
FIG. 2 is a block diagram showing one example of the present invention.

FIG. 2 is a block diagram showing one example of the present invention.

A photoelectric detection circuit 1 detects the perforations of film by means of a photosensor 1a connected thereto. A recording-reproducing circuit 2 records various information onto a film with a magnetic head 2a or reproduces the information prestored in the film such as exposable frame number or film sensitivity.

A motor drive circuit 3 drives a film feed motor 3a connected thereto to feed the film. A half-push switch SW1 is turned on when a shutter release is half pushed, and a full-push switch SW2 is turned on when the shutter release is fully pushed.

A control circuit 4 consists of a microcomputer and peripheral components such as a memory 4a (frame number memory means), and controls the motor drive circuit 3 based on signals from switches SW1, SW2, the photoelectric detection circuit 1, and the recording-reproducing circuit 2.

Figure 3A:
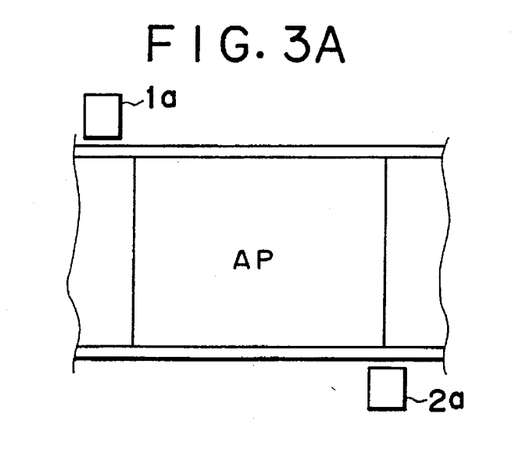
FIG. 3A is a view showing the relation between an aperture and a photosensor and a magnetic head of a camera.
Figure 3B:
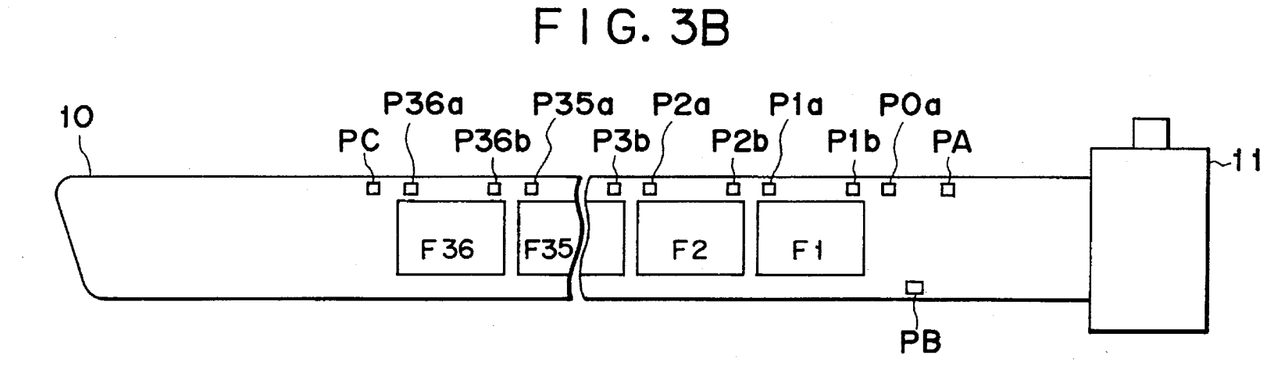
FIG. 3B is a view showing one example of film for use in the present invention.

FIG. 3A is a view showing the arrangement of an aperture AP, a photosensor 1a and a magnetic head 2a of a camera according to the present invention. FIG. 3B is a view showing one example of a 36-frame film for use with the present invention, in which all the film 10 is pulled out from the film cartridge 11. This film provides a minimum number of perforations necessary for each picture plane, with a reduced number of perforations for use in feeding the film, so as to secure sufficient storage area outside of the picture plane, and allocates its unoccupied space to the storage area. That is, all perforations at the lower side are omitted, and its unoccupied space is used for the storage area.

In FIG. 3B, F1 to F36 show the first to thirty sixth picture plane frames, each picture plane having two film feed apertures P1a, P1b, P2a, P2b, . . . , or P36a, P36b punched on correct positions. PA and PB are perforations indicating the end of the film 10. These perforations are detected by the photosensor 1a as shown in FIG. 2. It is noted that when the picture plane F1 at the first frame is positioned at the aperture AP as shown in FIG. 3A, the photosensor 1a comes to a position opposed to the perforation P2b. Continuing in a similar manner, when the thirty-sixth frame is positioned at the aperture AP, the photosensor 1a comes to a position opposed to perforation PC. Also, at the portion opposite the perforations of the film 10 to which the magnetic head 2a is placed opposed, the storage area for various information as above described is provided.

Figure 4:
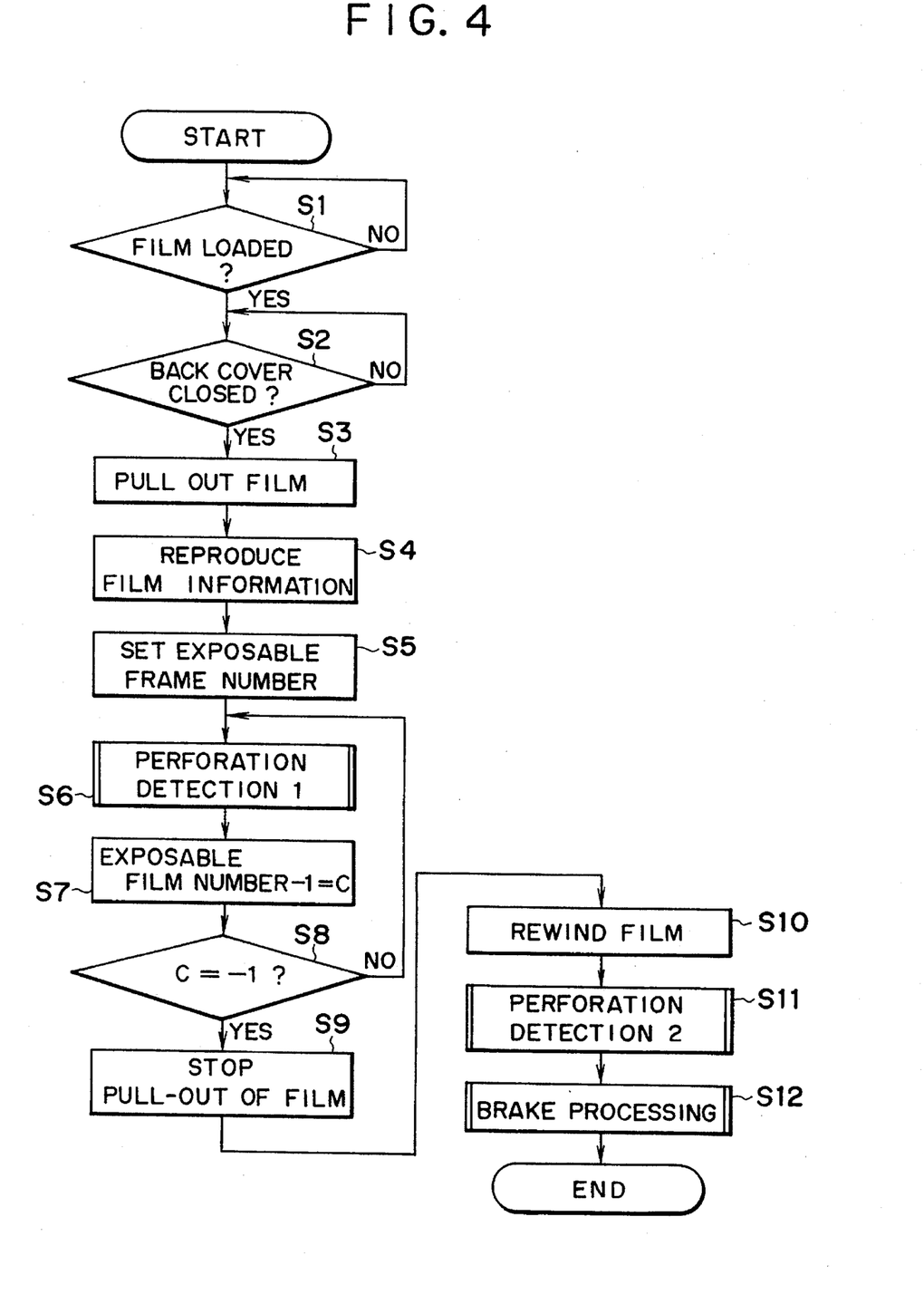
FIG. 4 is a flowchart showing an initial film feed control program.

FIG. 4 is a flowchart showing the film feed control main program executed in the control circuit 4. This program is activated when a back cover is opened in the state where a main switch of the camera is turned on. With reference to the same figure, the operation from the loading of the film cartridge 11 to the feeding of the first frame to a position opposed to the aperture AP will be described below.

First, at step S1, a determination is made whether the film cartridge 11 is loaded, using a film cartridge detection sensor, not shown, provided on a film cartridge chamber. The same step is repeated until the film cartridge 11 is loaded, and if it has been loaded, the routine proceeds to step S2. At step S2, a determination is made whether the back cover of the camera is closed, using a back cover sensor, not shown, in which the same step is repeated until it is closed, and if it has been closed, the routine proceeds to step S3.

At step S3, DC voltage is continuously applied via the motor drive circuit 3 to the film feed motor 3a for the feeding of film 10, i.e., pull out of film 10. Next, at step S4, the information stored in the information storage area is reproduced by the magnetic head 2a and the recording-reproducing circuit 2, and then stored in the memory 4a. At next step S5, the exposable frame number of the film 10 loaded therein from the reproduced information is set into an internal counter C of the control circuit 4, and then the routine proceeds to step S6 where a perforation detection 1 subroutine as shown in FIG. 5 is executed.

Figure 5:
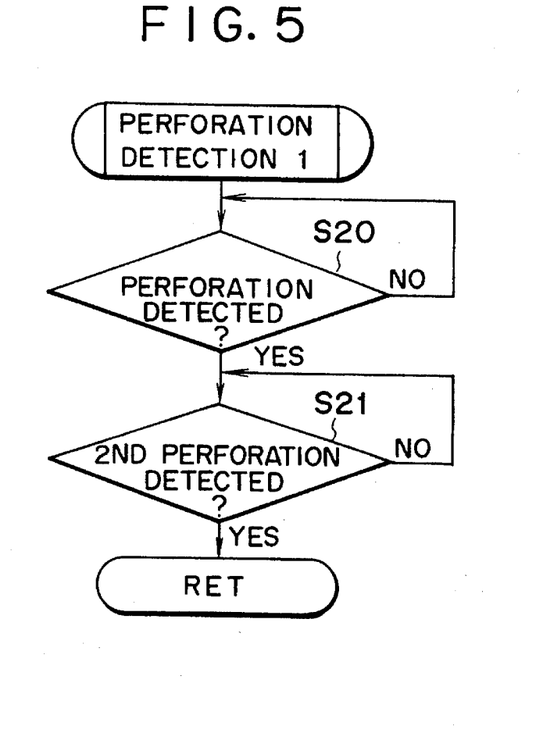
FIG. 5 is a flowchart showing a first perforation detection subroutine.

At step S20 of FIG. 5, a determination is made whether the first perforation PC is detected, using the photosensor 1a and the photoelectric detection circuit 1, in which the same step is repeated until it is detected, and if detected, the routine proceeds to step S21. At step S21, a determination is made whether the second perforation P36a is detected, in which the same step is repeated until it is detected, and if detected, the routine returns to a main program as shown in FIG. 4. Since the film shown in FIG. 3 has two perforations punched for each picture plane, as above described, the feeding of film by one frame can be recognized when this subroutine detects two perforations at the pull-out.

Figure 6:
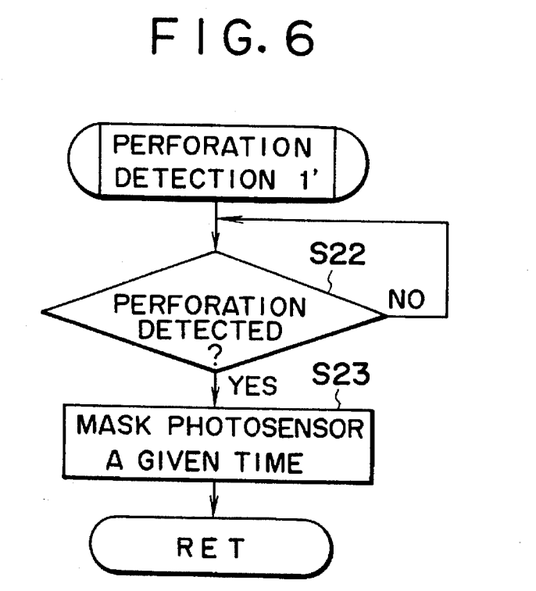
FIG. 6 is a flowchart showing a variation of FIG. 5.

While in the perforation detection 1 subroutine as shown in FIG. 5, the feeding of film 10 by one frame is recognized by detecting two perforations, it is also possible to count the film feed frame number by operating a timer for a predetermined period if a first perforation is detected. That is, as shown in FIG. 6, at step S22, if a first perforation is detected, the routine proceeds to step S23 where the photosensor 1a is masked for a given time so as not to detect a second perforation, and the routine returns to the main program after a predetermined time has passed.

At step S7 of FIG. 4, the counter C is decremented, and then the routine proceeds to step S8, where a determination is made whether the value of the counter C is C=−1, i.e., the first frame F1 of the film 10 passing through the aperture AP has been pulled out excessively by almost one frame. And if the pull-out has been completed up to a predetermined position, the routine proceeds to step S9, and if not, the routine returns to step S6, in which steps S6 and S7 are repeated in the same way as above described. If a positive determination is made at step S8, the pull-out of the film 10 is stopped by stopping the film feed motor 3a via the motor drive circuit 3, at step S9. It is noted that at this time, the film 10 is stopped in a state where the first frame F1 passing through the aperture AP is pulled out excessively by almost one frame, and the photosensor 1a is opposed to an intermediate position between the perforations P0a and PA.

Next, the routine proceeds to step S10 where the film 10 is rewound into the cartridge 11 by applying continuously the inverse voltage to the film feed motor 3a via the motor drive circuit 3 and reversing the film feed direction. At the following step S11, a perforation detection 2 subroutine as shown in FIG. 7 is started.

Figure 7:
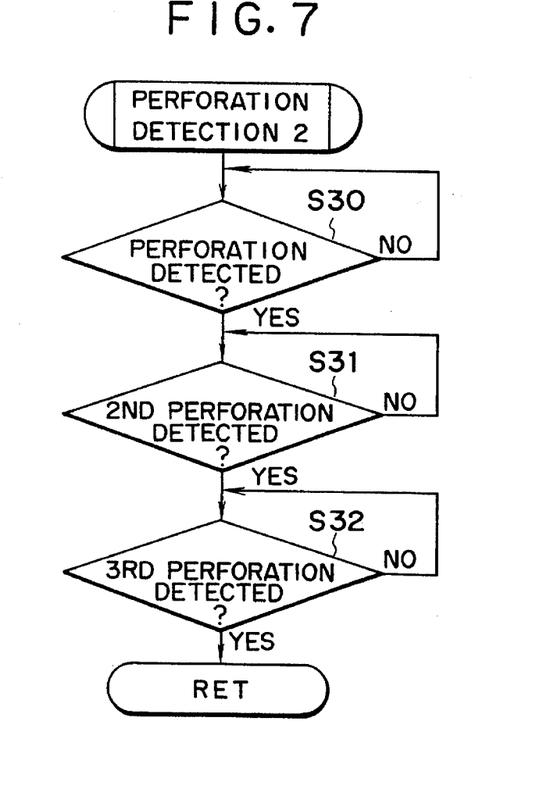
FIG. 7 is a flowchart showing a second perforation detection subroutine.

At step S30 of FIG. 7, a determination is made whether the perforation P0a is detected, in which the same step is repeated until it is detected. If the perforation P0a is detected, the routine proceeds to step S31 where a determination is made whether the second perforation P1b is detected, in which the same step is repeated until it is detected. If the perforation P1b is detected, the routine proceeds to step S32 where the third perforation P1a is detected, in which the same step is repeated until it is detected. And if the perforation P1a is detected, the routine returns to the main program.

Figure 8:
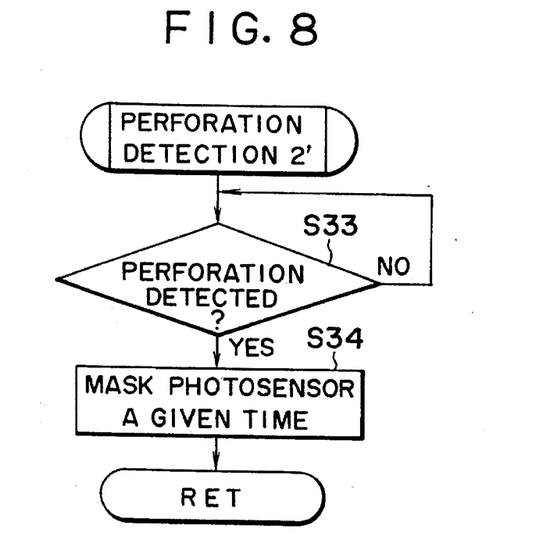
FIG. 8 is a flowchart showing a variation of FIG. 7.

While in the perforation detection 2 subroutine as shown in FIG. 7, the film is rewound back to a predetermined position by detecting three perforations, it is also conceived that the timer is operated for a predetermined period if the first perforation is detected, and the film is rewound during that period. That is, as shown in FIG. 8, if the first perforation is detected at step S33, the routine proceeds to step S34, where the photosensor 1a is masked for a predetermined period so as not to detect the second and third perforations, and after a predetermined period, the routine returns to the main program.

Figure 9:
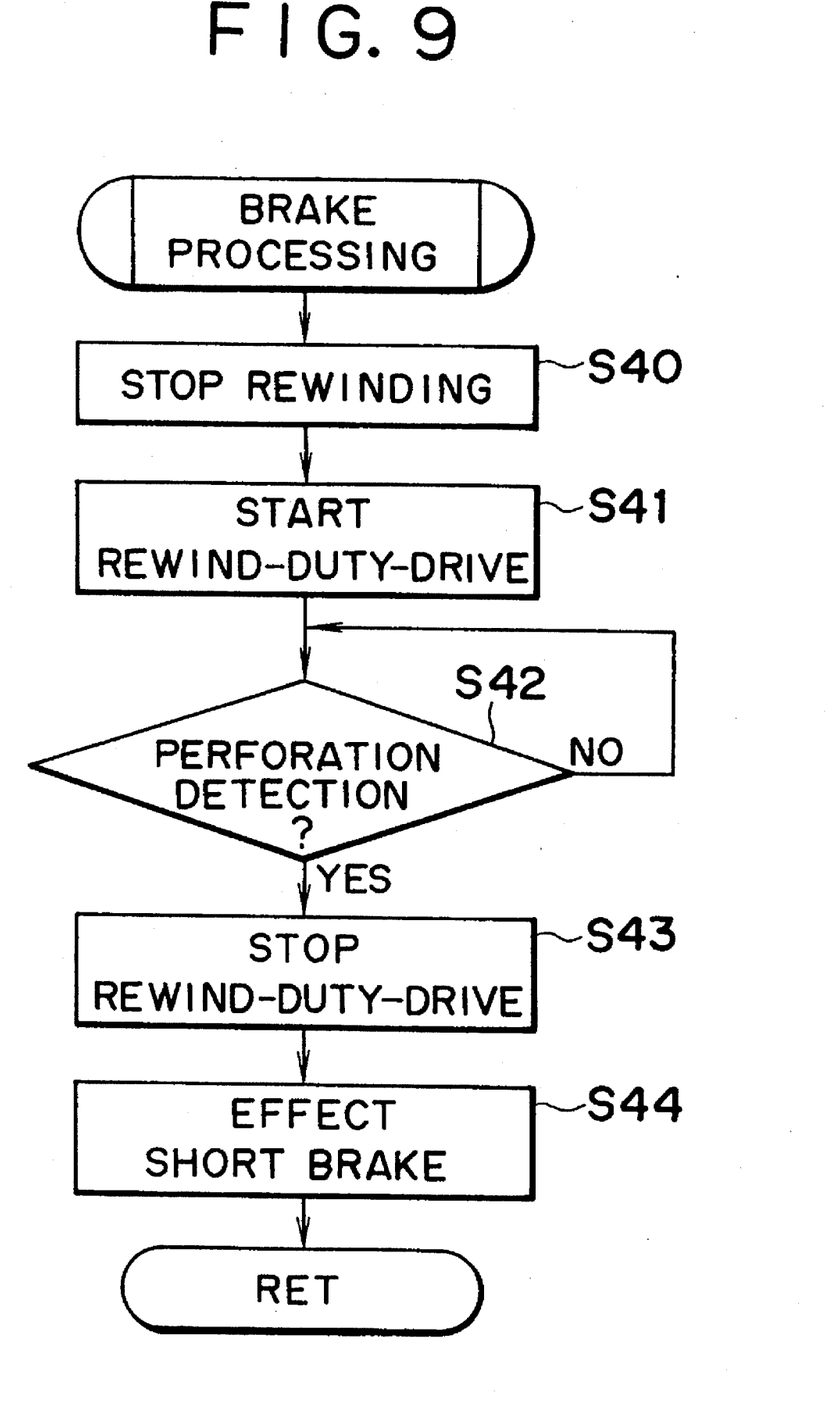
FIG. 9 is a flowchart showing a brake processing subroutine.

Returning to FIG. 4, at step S12, a brake processing subroutine as shown in FIG. 9 is executed. This brake processing subroutine is a program for stopping each picture plane of the film 10 at the position opposed to the aperture AP.

At step S40 of FIG. 9, the rewinding of the film 10 is stopped. At next step S41, the rewind-duty-drive of the film to is started.

Figure 10A:
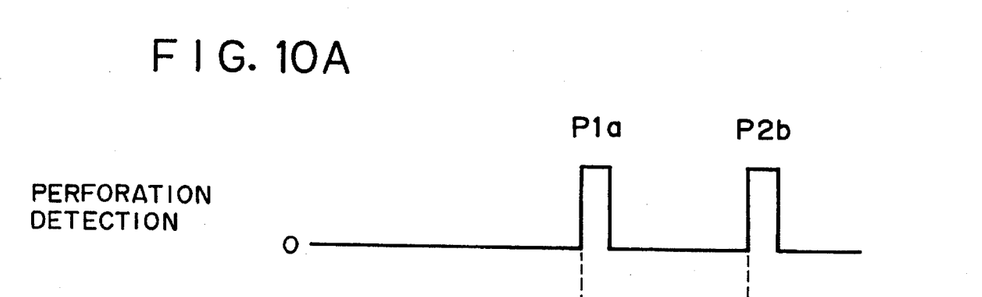
FIG. 10A is a view showing the photosensor output waveform at the perforation detection.
Figure 10B:
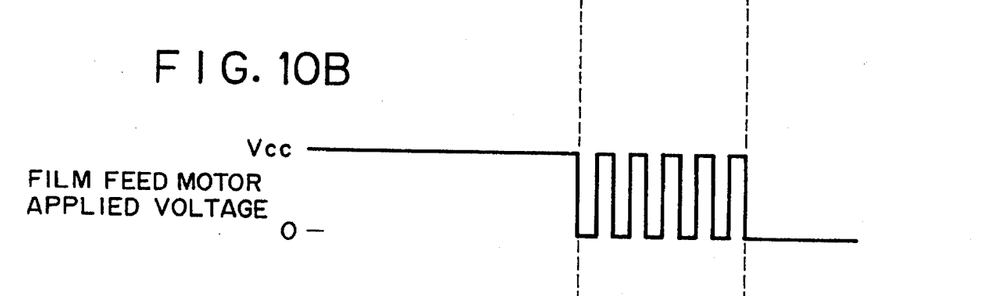
FIG. 10B is a view showing the voltage waveform applied to a film feed motor.

The duty drive is to drive the film feed motor 3a at a low speed by applying the voltage $V_{cc}$ thereto intermittently, as shown in FIG. 10B, so as to stop correctly the first frame F1 of the film 10 at a position opposed to the aperture AP. As shown in FIG. 10A, the duty drive is started from the time t1 when the perforation P1a is detected by the photosensor 1a, and continued up to the time t2 when the perforation P2b is detected by the photosensor 1a.

Figure 10C:
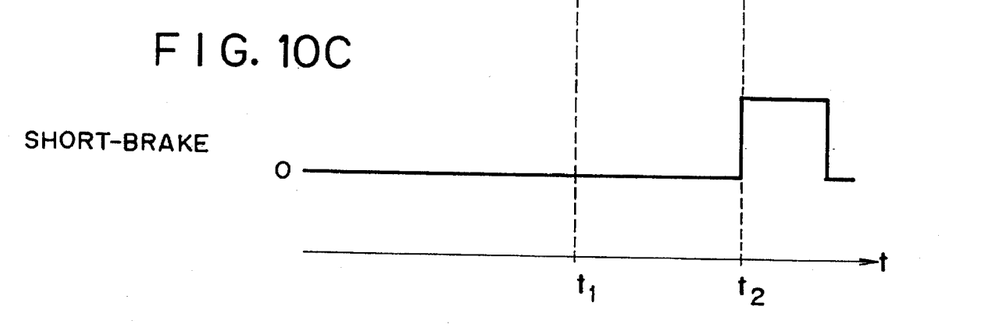
FIG. 10C is a view showing the operation waveform at the short-brake of the film feed motor.

At step S42 of FIG. 9, a determination is made whether the perforation P2b is detected, in which the same step is repeated until it is detected. As above described, if the perforation P2b is detected at the time t2 of FIG. 10, the routine proceeds to step S43 where the rewind-duty-drive is stopped. Further, at next step S44, the short brake is effected to the film feed motor 3a. That is, dynamic braking is effected by short-circuiting drive electrodes of the motor 3a at the time t2 as shown in FIG. 10C, so as to stop the film correctly at a position where the first frame F1 of the film 10 is opposed to the aperture AP.

In order to further increase the stop precision at this time, it is also possible to forcedly supply the braking power from the motor drive circuit 3 to the motor 3a by switching the connection between the output of the motor drive circuit 3 and the drive electrodes of the motor 3a to the reverse polarity by means of a relay, i.e., to effect the so-called reverse energizing brake.

Figure 11:
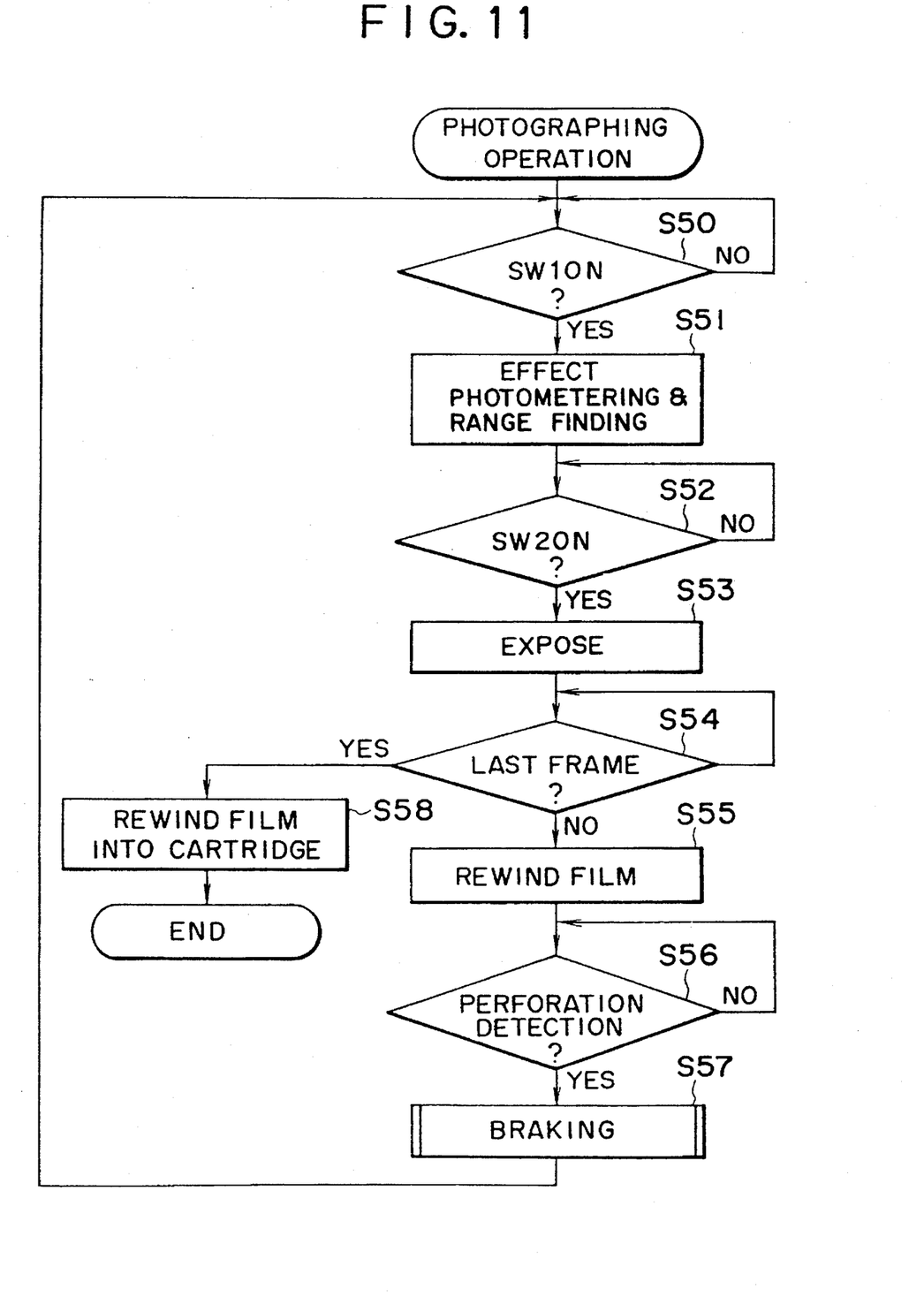
FIG. 11 is a flowchart showing the photographing operation of a camera and the film rewinding process for each photographing.

FIG. 11 is a program for processing the photographing operation and the film rewinding for each photograph after the first frame of the film 10 is positioned at a predetermined picture position.

First, at step S50, a determination is made whether a half-push switch SW1 for shutter release is turned on, in which the same step is repeated until it is turned on, and if it is turned on, the routine proceeds to step S51 where photometering and range finding are effected. Further, at step S52, a determination is made whether a shutter release full-push switch SW2 is turned on, in which the same step is repeated until it is turned on, and if it is turned on, the routine proceeds to step S53 where the exposure is effected.

Next, at step S54, a determination is made whether the frame is the last frame, i.e., thirty-sixth frame F36. And if a positive determination is made, the routine proceeds to step S58, where the film 10 is all rewound into the film cartridge 11 and the program is terminated. If a negative determination is made at step S54, the routine proceeds to step S55, where the rewinding of the film 10 is started by continuously applying the drive voltage $V_{cc}$ via the motor drive circuit 3 to the film feed motor 3a. At next step S56, a determination is made whether the perforation P2a is detected, in which the same step is repeated until it is detected, and if detected, the routine proceeds to step S57 where the above brake processing is performed. That is, the film 10 is rewound at a low speed from the time when the photosensor 1a detects the perforation P2b to the time when it detects the next perforation P3b, and if it detects the perforation P3b, the motor 3a is braked to position correctly the second frame F2 of the film 10 at a position opposed to the aperture AP.

If the above processing is terminated, the routine returns to step S50, where the photographing operation after the second frame and the film rewind processing for each photograph are effected in the same way as above described.

As above described, the first frame can be correctly positioned because if the film is loaded into a camera in the prewind method, the film is pulled out from the cartridge excessively by almost one frame from the predetermined first frame, and then rewound up to a predetermined position at a normal speed by reversing the film feed direction, and if it arrives at the predetermined position, it is fed by switching the feed speed to a low speed, and stopped by braking if the first frame reaches a position opposed to the aperture.

While in the example as above described, the exposable frame number recorded in the film is read by the magnetic head and the recording-reproducing circuit, it is also permitted that the exposable frame number is set into an exposable frame number setting device provided on a camera, and its frame number signal is input into the control circuit.

While in the above example, at the pull-out of the film, the feeding of the film is stopped by detecting its termination in terms of perforations P1b and P0a with the photosensor, it can be also stopped by detecting mechanically or electrically the perforation PA or PB indicating the termination of the film.

In the above example, the photosensor 1a, the photoelectric detection circuit 1 and the control circuit 4 constitute the frame number counting means, the memory 4a constitutes the frame number memory means, and the control circuit 4 constitutes the pulled-out film length detecting means and the film feed control means, respectively.

As above described, according to the present invention, the first frame can be correctly positioned and further, the information can be recorded and reproduced in the film surely because when the first frame is positioned correctly to the aperture by prewinding the film, even after the exposable frame number of unexposed film is pulled out prior to photographing, the film is further pulled out by a predetermined amount, and then fed so as to oppose the first frame of the film to the aperture by reversing the film feed direction.

We claim:

1. A camera including a photographing aperture and a film feed device for feeding a film, said film having a magnetic recording area, having a plurality of perforations arranged along a side of the film, and having a plurality of film frames, each adapted to be aligned with said aperture and disposed so that each frame has two corresponding perforations, one of which is at a left end of the frame and the other of which is at a right end of the frame, each of the two perforations of each frame being separate from each of the two perforations of any adjacent frame, said camera comprising:

a magnetic head disposed to reproduce information from or record information on said magnetic recording area;

perforation detecting means for detecting said perforations; and control means responsive to said perforation detecting means for controlling said film feed device so that a perforation at a left side of a film frame to be exposed is disposed at a left side of said aperture and a perforation at a right side of the same film frame is disposed at a right side of said aperture, thereby to align that film frame with said aperture for exposure.

2. A film feed control device according to claim 1, wherein said film feed device is capable of operating to feed film at a first speed or a second speed slower than said first speed, and wherein said control means controls said film feed device to operate at said first speed during an interval between detecting of a perforation at one side of a film frame and detecting of a perforation at the other side of that film frame, and to operate at said slower speed during an interval between detecting of the last-mentioned perforation and detecting of an adjacent perforation corresponding to a next film frame.

3. A camera including a photographing aperture and a film feed device for feeding a film, said film having an information recording area, having a plurality of perforations arranged along a side of the film, and having a plurality of film frames, each adapted to be aligned with said aperture and disposed so that each frame has two corresponding perforations one of which is at a left end of the frame and the other of which is at a right end of the frame, each of the two perforations of each frame being separate from each of the two perforations of any adjacent frame, said camera comprising:

an information recording means disposed to record information on said information recording area;

perforation detecting means for detecting said perforations; and control means responsive to said perforation detecting means for controlling said film feed device so that a perforation at a left side of a film frame to be exposed is disposed at a left side of said aperture and a perforation at a right side of the same film frame is disposed at a right side of said aperture, thereby to align that film frame with said aperture for exposure.

4. A camera including a photographing aperture and a film feed device for feeding a film, said film having a magnetic recording area, having a plurality of perforations arranged along a side of the film, and having a plurality of film frames, each adapted to be aligned with said aperture and disposed so that each frame has two corresponding perforations, one of which is at a left end of the frame and the other of which is at a right end of the frame, said camera comprising:

a magnetic head disposed to reproduce information from or record information on said magnetic recording area;

perforation detecting means for detecting said perforations; and control means responsive to said perforation detecting means for controlling said film feed device to stop feeding the film when said perforation detecting means detects two perforations.

5. A camera including a photographing aperture and a film feed device for feeding a film, said film having an information recording area, having a plurality of perforations arranged along a side of the film, and having a plurality of film frames, each adapted to be aligned with said aperture and disposed so that each frame has two corresponding perforations, one of which is at a left end of the frame and the other of which is at a right end of the frame, said camera comprising:

an information recording means disposed to record information on said information recording area;

perforation detecting means for detecting said perforations; and control means responsive to said perforation detecting means for controlling said film feed device to stop feeding the film when said perforation detecting means detects two perforations.

6. A camera including a photographing aperture and a film feed device for feeding a film, said film having an information recording area, having a plurality of film frames, each adapted to be aligned with said aperture and disposed so that each frame has two corresponding perforations, one of which is at a left end of the frame and the other of which is at a right end of the frame, said camera comprising:

an information recorder disposed to record information on said information recording area;

a perforation detector disposed to detect said perforations; and a controller responsive to said perforation detector and disposed to control said film feed device to stop feeding the film when said perforation detector detects two perforations.

7. An apparatus including a photographing aperture and a film feed device for feeding a film, said film having a plurality of perforations and a plurality of film frames, each frame adapted to be aligned with said aperture and disposed so that each frame has two corresponding perforations, one of which is at a left end of the frame and the other of which is at a right end of the frame, said apparatus comprising:

perforation detecting means for detecting said perforations; and control means responsive to said perforation detecting means for controlling said film feed device to stop feeding said film when said perforation detecting means detects two perforations.

8. An apparatus including a photographing aperture and a film feed device for feeding a film, said film having a plurality of perforations and a plurality of film frames, each frame adapted to be aligned with said aperture and disposed so that each frame has two corresponding perforations, one of which is at a left end of the frame and the other of which is at a right end of the frame, said apparatus comprising:

a perforation detector for detecting said perforations; and a controller responsive to said perforation detector for controlling said film feed device to stop feeding said film when said perforation detector detects two perforations.

9. A film feeding controlling method in an apparatus including a photographing aperture and a film feed device for feeding a film, said film having a plurality of perforations and a plurality of film frames, each frame adapted to be aligned with said aperture and disposed so that each frame has two corresponding perforations, one of which is at a left end of the frame and the other of which is at a right end of the frame, said method comprising the steps of:

detecting two perforations corresponding to a frame; and stopping said feeding of said film when said two perforations are detected.

10. An apparatus including a film feed device for feeding a film and a photographing aperture, said film having an information recording area and a plurality of film frames, each frame adapted to be aligned with said aperture and disposed so that each frame has two corresponding perforations, one of which is at a left end of the frame and the other of which is at a right end of the frame, said apparatus comprising:

an information recorder disposed to record information on said information recording area;

a perforation detector for detecting said perforations; and a controller responsive to said perforation detector for controlling said film feed device to stop feeding said film when said perforation detector detects two perforations.

11. A film feeding controlling method in an apparatus including a film feed device for feeding a film and a photographing aperture, said film having an information recording area and a plurality of film frames, each frame adapted to be aligned with said aperture and disposed so that each frame has two corresponding perforations, one of which is at a left end of the frame and the other of which is at a right end of the frame, said method comprising the steps of:

detecting two perforations corresponding to a frame; and stopping said feeding of said film when said two perforations are detected.

12. A device having an aperture portion and a film feed mechanism for feeding a film, said film having a plurality of perforations arranged along a side of the film and a plurality of film frames, each frame adapted to be aligned with said aperture portion and disposed so that each frame has two corresponding perforations, one of which is at a left side of the frame and the other of which is at a right side of the frame, each of the two perforations of each frame being separate from each of the two perforations of any adjacent frame, said device comprising:

a perforation detector which detects said perforations; and a controller responsive to said perforation detector to control said film feed mechanism so that a perforation at the left side of said film frame to be exposed is disposed at a left side of said aperture portion and a perforation at the right side of that film frame is disposed at a right side of said aperture portion, thereby to align said film frame to be exposed with said aperture portion.

13. A device including a photographing aperture portion and a film feed mechanism for feeding a film, said film having a plurality of perforations arranged along a side of the film and a plurality of film frames, each frame adapted to be aligned with said aperture portion and disposed so that each frame has two corresponding perforations, one of which is at a left side of the frame and the other of which is at a right side of the frame, the device comprising:

a perforation detector which detects said perforations; and a controller responsive to said perforation detector to control film feed operations of said film feed mechanism, said controller controlling said film feed mechanism to operate at a first speed during an interval between a timing corresponding to detecting of a perforation at one side of a film frame and a timing corresponding to detecting of a perforation at the other side of that film frame, and to operate at a second speed, which is different from said first speed, during an interval between a timing corresponding to detecting of said perforation at said other side and a timing corresponding to detecting of a perforation corresponding to a next film frame.

14. A device according to claim 13, wherein said first speed is faster than said second speed.

15. A device according to claim 13, wherein said device is provided on a camera.

16. A device including a photographing aperture portion and a film feed mechanism for feeding a film, said film having a plurality of perforations arranged along a side of the film and a plurality of film frames, each adapted to be aligned with said aperture portion and disposed so that each frame has two corresponding perforations, one of which is at a left side of the frame and the other of which is at a right side of the frame, said device comprising:

a perforation detector which detects said perforations; and a controller responsive to said perforation detector to control said film feed mechanism to effect film feeding, the controller controlling the film feed mechanism in response to said perforation detector to select either of a first speed or a second speed which is smaller than the first speed and to operate at the selected speed.

\* \* \* \* \*